United States Patent
Phillips

(10) Patent No.: US 11,501,917 B2
(45) Date of Patent: Nov. 15, 2022

(54) CAPACITORS EMPLOYING DIELECTRIC MATERIAL OUTSIDE VOLUME ENCLOSED BY ELECTRODES

(71) Applicant: Jonathan Phillips, Pacific Grove, CA (US)

(72) Inventor: Jonathan Phillips, Pacific Grove, CA (US)

(73) Assignee: CAPACITOR FOUNDRY LLC, Thousand Oaks, CA (US)

( * ) Notice: Subject to any disclaimer, the term of this patent is extended or adjusted under 35 U.S.C. 154(b) by 0 days.

(21) Appl. No.: 16/292,286

(22) Filed: Mar. 4, 2019

(65) Prior Publication Data

US 2019/0272953 A1    Sep. 5, 2019

Related U.S. Application Data

(60) Provisional application No. 62/637,863, filed on Mar. 2, 2018.

(51) Int. Cl.
  *H01G 4/04*    (2006.01)
  *H01G 4/005*   (2006.01)

(52) U.S. Cl.
  CPC .............. *H01G 4/04* (2013.01); *H01G 4/005* (2013.01)

(58) Field of Classification Search
  CPC ............. H01G 4/04; H01G 9/02; H01G 4/005
  See application file for complete search history.

(56) References Cited

U.S. PATENT DOCUMENTS

| 9,530,574 | B1 | 12/2016 | Phillips et al. | |
|---|---|---|---|---|
| 9,711,293 | B1 | 7/2017 | Phillips | |
| 9,870,875 | B1 | 1/2018 | Phillips | |
| 2003/0030969 | A1* | 2/2003 | Farahmandi | H01G 11/72 361/502 |
| 2004/0079917 | A1* | 4/2004 | Hayes | H05K 5/0213 252/70 |
| 2009/0316336 | A1* | 12/2009 | Fan | H01G 9/02 361/502 |
| 2011/0018778 | A1* | 1/2011 | Mayes | H01Q 9/28 343/793 |
| 2011/0128010 | A1* | 6/2011 | Gianchandani | G01L 9/0072 324/460 |
| 2013/0105406 | A1* | 5/2013 | Van Der Wal | C02F 1/4691 210/748.16 |
| 2013/0169237 | A1* | 7/2013 | McWhorter | H01M 10/44 320/137 |
| 2016/0186334 | A1* | 6/2016 | Murahara | C25B 9/73 429/188 |
| 2016/0204492 | A1* | 7/2016 | Jiang | H01M 10/0525 257/532 |

(Continued)

OTHER PUBLICATIONS

S. Fromille; J. Phillips, Materials 7, 8197 (2014).

(Continued)

*Primary Examiner* — Michael P McFadden
(74) *Attorney, Agent, or Firm* — MH2 Technology Law Group LLP

(57) ABSTRACT

A parallel plate capacitor including a cathode core that further includes a pair of parallel electrodes and a dielectric material layer positioned between the pair of parallel electrodes. The capacitor also includes a dielectric liquid medium, where the cathode core is at least partially submerged in the dielectric liquid medium.

16 Claims, 7 Drawing Sheets

(56) References Cited

U.S. PATENT DOCUMENTS

2016/0285137 A1\* 9/2016 Gayden .................. H01G 11/08
2017/0278636 A1\* 9/2017 Weir ........................ H01G 4/18
2018/0233791 A1\* 8/2018 Tong ................. H01M 10/6568

OTHER PUBLICATIONS

F. Quintero, F.; J. Phillips, J. Electron. Mater. 44, 1367 (2015,).
N. Jenkins, C.Petty, J. Phillips, Materials 9, 118 (2016).
F.J. Q. Cortes, P.J. Arias-Monje, J. Phillips and H. Zea, Materials & Design 96, 80 (2016).
J. Gandy, F. J. Q. Quintero, J. Phillips, J. Electron. Mater. 45, 5499 (2016).
J. Phillips, Materials 9, 918 (2016).

\* cited by examiner

CAPACITORS EMPLOYING DIELECTRIC MATERIAL OUTSIDE VOLUME ENCLOSED BY ELECTRODES

RELATION TO OTHER APPLICATIONS

This application claims priority to and the benefit of U.S. Application No. 62/637,863 filed Mar. 2, 2018, which is hereby incorporated in its entirety by reference.

FIELD OF THE INVENTION

The present invention is directed to a parallel plate capacitor with high dielectric constant material on the outer surfaces of the capacitor.

BACKGROUND

A parallel plate type capacitor is typically constructed using two conductive (generally metal) plates at a distance parallel to each other, and a dielectric material in the volume between the plates. A simple formula, unchanged for more than a century, is almost universally believed to accurately predict capacitance. According to that formula, the net capacitance value is proportional to the surface area of the conductive plates, inversely proportional distance of separation between the plates, and proportional to the 'dielectric constant' of the material between the plates. Specifically, the larger the plates and/or smaller their separation, and the larger the dielectric constant of the material between the plates, the greater is the capacitance. There is no provision in the mathematical formulation of this model of parallel plate capacitor capacitance for consideration of any properties of materials not between the plates. Of particular relevance: There is no means in this model for consideration of the dielectric properties of material outside the volume between the plates. That is, in both theory and mathematical formulation of the standard model, the dielectric property of material outside the volume between the plates is considered irrelevant to the determination of capacitance.

A typical parallel plate capacitor 100 is shown in FIG. 1A. The core capacitor 100 includes a non-electrically conducting material 102 between two conductive electrodes 104. The specific capacitor configuration employed is 2 cm×2 cm×0.01 mm titanium metal electrodes 104, each with a 3 cm×3 mm×0.01 mm 'tail'/contact, and a dielectric 102 made of either a 2.5 cm×2.5 cm×20 micron square of Celgard 2320 or a 2.5 cm×2.5 cm×25 micron square of polyethylene-linear low density (LLDPE). The dielectric 102 was placed between the electrodes 104 such that the dielectric 102 extends in all directions slightly beyond the area enclosed by the titanium metal electrodes 104.

Another standard parallel plate capacitor 150 is shown in FIG. 1B. The primary difference between the gel capacitor 150 and core capacitor 100 is the addition of an effective, viscous, super dielectric material (SDM) gel 106, described below with respect to FIG. 2A. Both sides of the dielectric sheet 102 are coated with a thin layer of the gel 106, as shown.

SUMMARY

Embodiments in accordance with the invention relate a capacitor. In short, the invention is any capacitor in which dielectric material is employed outside the volume enclosed by the electrodes for the purpose of increasing capacitance. In some cases, the parallel plate capacitor includes two parallel plates with a weak dielectric between the electrodes (e.g., Teflon) and is submerged, or partially submerged, in distilled water. No water enters the volume between the electrodes.

In some cases, the parallel plate capacitor includes two parallel plates with the weak dielectric between the electrodes and is submerged, or partially submerged, in water containing free ions, such as water containing dissolved salt.

In some cases, the parallel plate capacitor includes two parallel plates with a weak dielectric between the electrodes and is covered on the outside in a superdielectric gel, where the gel is understood to be a high viscosity substance that can be molded into a shape and can retain that shape. For example, the superdielectric gel may be a fumed silica gel that is a mix of 20 wt % fumed silica and 80 wt % water with dissolved salt, such as a very small amount (0.1% by weight) or a large amount (35% by weight) NaCl.

In some cases, the parallel plate capacitor may be as described above except the weak dielectric in the volume between the plates is replaced with a material with a strong dielectric constant, such as water containing dissolved salts, or an acid such as boric acid in any pH strength, or a base such as KOH, up to 130% by weight, dissolved in water. The outside of the capacitor, as described above, can be covered with a self-supporting high dielectric material, such as a gel, or submerged, or partially submerged in a liquid bath of high dielectric material such as water containing dissolved salt.

In some cases, the capacitor is a parallel plate capacitor that includes a cathode core, where the cathode core further includes a first electrode of an electrically conducting material and an ionically conducting material, a second electrode, and a first dielectric material layer that separates the first electrode and the second electrode. The parallel plate capacitor also includes a first dielectric sheet positioned at a first exterior surface of the first electrode a second dielectric sheet positioned at a second exterior surface of the second electrode, the first and second dielectric sheet each further including a second dielectric material layer and a superdielectric gel layer in direct contact with the corresponding exterior surface.

In some embodiments, each of the first and second dielectric sheet has a larger area than the cathode core, and the cathode core is fully enclosed by the superdielectric gel layer.

In some embodiments, the superdielectric gel layer comprises fumed silica and water with dissolved salt. The weight concentration of the water with dissolved salt is in a wide range from 0.05% to ~35% at 298 K, and higher concentrations at higher temperatures.

In some embodiments, charge travels between the first dielectric sheet and the second dielectric sheet thereby creating a dielectric dipole that is oppositely polarized to a cathode dipole created by the cathode core.

In some embodiments, the second dielectric material layer is about less than 20 microns thick.

In some embodiments, the first and second dielectric material layers each have a dielectric constant of less than 200.

In some embodiments, the first and second electrodes are metallic.

In some embodiments, the superdielectric gel layer is applied as a coating of the second dielectric material layer.

Embodiments in accordance with the invention are best understood by reference to the following detailed description when read in conjunction with the accompanying drawings.

Figure 1A:
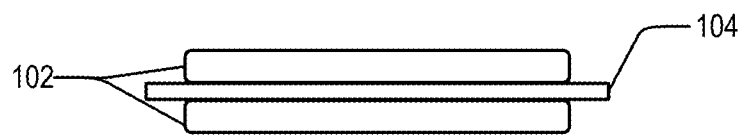
FIGS. 1A and 1B illustrate prior art parallel plate capacitors.
Figure 1B:
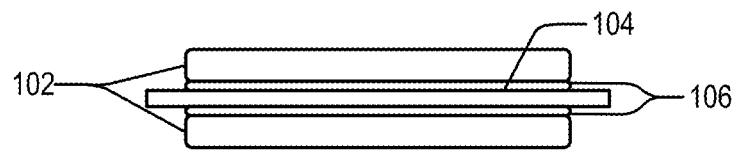

Embodiments in accordance with the invention are further described herein with reference to the drawings.

DETAILED DESCRIPTION

For illustrative purposes, the principles of the present disclosure are described by referencing various exemplary embodiments. Although certain embodiments are specifically described herein, one of ordinary skill in the art will readily recognize that the same principles are applicable to, and can be employed in other systems and methods.

Before explaining the disclosed embodiments of the present disclosure in detail, it is to be understood that the disclosure is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in different order as may be appreciated by one skilled in the art; the method embodiments described are therefore not limited to the particular arrangement of steps disclosed herein.

It is be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

The primary claim of innovation in this application is based on the finding, contrary to the standard model, that the properties of material outside the volume between the plates in a parallel plate capacitor make a difference, sometimes an enormous difference, in the capacitance and, hence, electrical energy storage capacity of a parallel plate capacitor. For example, it is demonstrated that a parallel plate capacitor with air between the plates but partially submerged in water containing dissolved salt can have a capacitance more than eight orders of magnitude higher than the same 'capacitor' sitting in the ambient laboratory atmosphere between the plates The SDM postulate states that the field at all points in space generated by dielectric material associated with a capacitor determines net effective dielectric constant (1-13). In contrast, the standard hypothesis of dielectric behavior posits that only the electric field between the electrodes is impacted by the dielectric. The SDM postulate advanced above indicates that the field at all points in space, not just between electrodes, is impacted by the dielectric and in turn the field beyond the electrodes impacts the effective dielectric constant. Further in contrast to the SDM postulate, the standard hypothesis implies that material outside the volume between the electrodes should have no impact on the effective dielectric constant. The SDM postulate implies that dielectric material outside the volume between the electrodes, that is all associated dielectric material, both between the plates and nearby dielectric material, can impact the effective dielectric constant. Just as the dielectric material between the electrodes can impact the electric field at all points in space, so can dielectric material outside this region impact the electric field at all points in space, including the volume between the electrodes.

Various configurations of parallel plate capacitors are described herein in view of the SDM postulate. Specifically, SDM is placed only on the outside of several parallel plate capacitors. The core structure, classically considered the capacitor, includes two metal electrodes with a thin sheet of low dielectric constant (<200) material between. The SDM on the outside of the capacitor dramatically increases the effective dielectric constant below ~1.2 volts. In several cases the observed "effective" dielectric constant was more than $10^8$ times that of the core structure.

The conductive electrodes used in the embodiments described herein can be metal or carbon. For metal electrodes, titanium can be selected because more traditional electrode materials, such as copper and aluminum, were found to corrode rapidly due to the aggressive chemistry generated by SDM at elevated voltage. Using titanium electrodes and an SDM gel created from fumed silica mixed with an aqueous salt (e.g., NaCl, LiI, $Na_2O$, CaI, KCl, $NH_3Cl$, $Cs_2O$, etc.) solution, dielectric values below ~1.2 volt are observed as high as $5\times10^9$.

In some embodiments of the invention, a parallel plate capacitor includes two parallel metal plates with a weak dielectric between the electrodes (e.g., Teflon) and is submerged, or partially submerged, in water. No water enters the volume between the electrodes. These embodiments were found in laboratory testing to increase the electrical energy storage of the capacitor by as many as 9 orders of magnitude. In other embodiments, the parallel plate capacitor includes two parallel metal plates with the weak dielectric between the electrodes and is submerged, or partially submerged, in water containing free ions, such as water containing dissolved NaCl. These embodiments were found in laboratory testing to increase the electrical energy storage of the capacitor by as many as 11 orders of magnitude.

In yet other embodiments, the parallel plate capacitor includes two parallel metal plates with a weak dielectric between the electrodes and is covered on the outside in a superdielectric gel, where the gel is understood to be a high viscosity substance that can be molded into a shape and can retain that shape. For example, the superdielectric gel may be a fumed silica gel that is a mix of 20 wt % fumed silica and 80 wt % water with dissolved salt. In these embodiments, no fumed silica gel enters the volume between the plates. These embodiments were found to increase the electrical energy storage of the capacitor by as much as 10 orders of magnitude relative to the same capacitor not covered in the gel.

In some embodiments, the parallel plate capacitor includes two parallel metal plates with a weak dielectric between the electrodes and is at least partially submerged in a superdielectric medium. For example, the superdielectric medium may be a polar solvent at 298K with dissolved salt. Examples of polar solvents include, but are not limited to, ethanol, methanol, acetone, methyl ethyl ketone, isopropanol, n-propanol, acetonitrile, DMSO (dimethyl sulfoxide)

DMF, and Polycarbonate. Examples of salts include, but are not limited to, NaCl, Li I, Na$_2$O, CaI, KCl, NH$_3$Cl, Cs$_2$O. In these embodiments, no polar solvent with dissolved salt enters the volume between the plates. These embodiments were found to increase the electrical energy storage of the capacitor by as much as 10 orders of magnitude relative to the same capacitor not covered in the polar solvent with dissolved salt.

In another example, the superdielectric medium may be a liquid acid. Examples of liquid acids include, but are not limited to, boric acid, citric acid, nitric acid, and hydrochloric acid.

In yet another example, the superdielectric medium may be a liquid base. Examples of liquid bases include, but are not limited to, potassium hydroxide, sodium hydroxide, and ammonia.

In some cases, the parallel plate capacitor may be as described above except the weak dielectric in the volume between the plates is replaced with a material with a strong dielectric constant, such as water containing dissolved salts. The outside of the capacitor, as described above, can be covered with a self-supporting high dielectric material, such as a gel, or submerged, or partially submerged in a liquid bath of high dielectric material such as water containing dissolved salt.

Figure 2A:
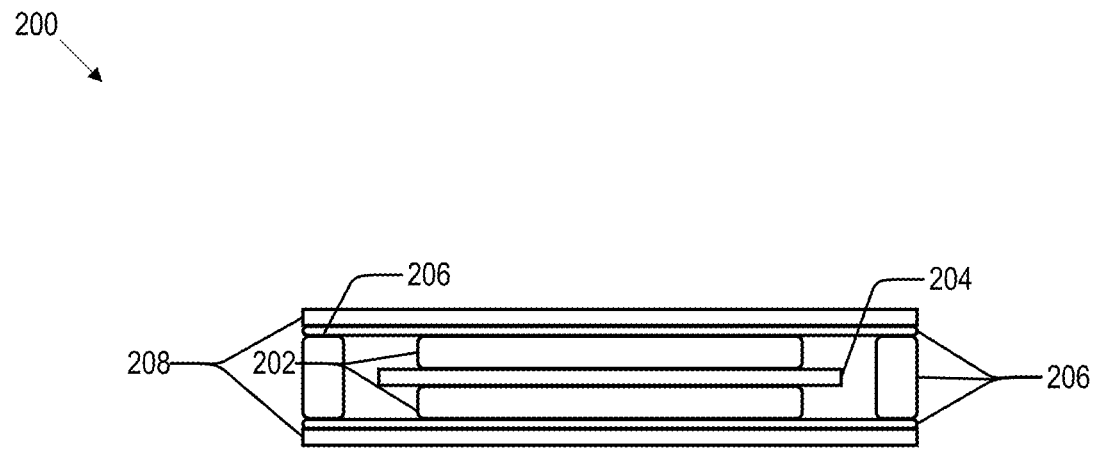
FIGS. 2A and 2B illustrate parallel plate capacitors with dielectric material on the outside.

FIG. 2A illustrates a parallel plate capacitor 200 with SDM 206 surrounding the core 202, 204 of the capacitor 200 on the outside. The core 202, 204 includes electrodes 202 and a central dielectric sheet 204. The SDM gel 206 on the outside surfaces is organized such that all the super dielectric material 206 is in electric contact with the electrodes 202. Specifically, two 3.5 cm×3.5 cm sections of separators 208 (e.g., 20 micron thick Celgard 2320, 25 micron thick linear low-density polyethylene (LLDPE)) are coated on one side with super dielectric gel 206, where varying thicknesses of gel 206 can be used. One coated sheet 206, 208 is placed on top of each electrode 202, where the coated sheet 206, 208 is outside the volume generally considered to be the core capacitor 202, 204. For both electrodes 202 the coated sheet 206, 208 is placed such that dielectric gel 206 is in direct contact with the electrode 202. Since the outer sheets 206, 208 are larger than the dielectric sheet 202, the superdielectric gel 206 from the top gel coated sheet 208, 206 is in direct contact with the superdielectric gel 206 of the bottom gel coated sheet 208, 206 such that the entire core 202, 204 is enclosed in a continuous layer of SDM 206.

Figure 2B:
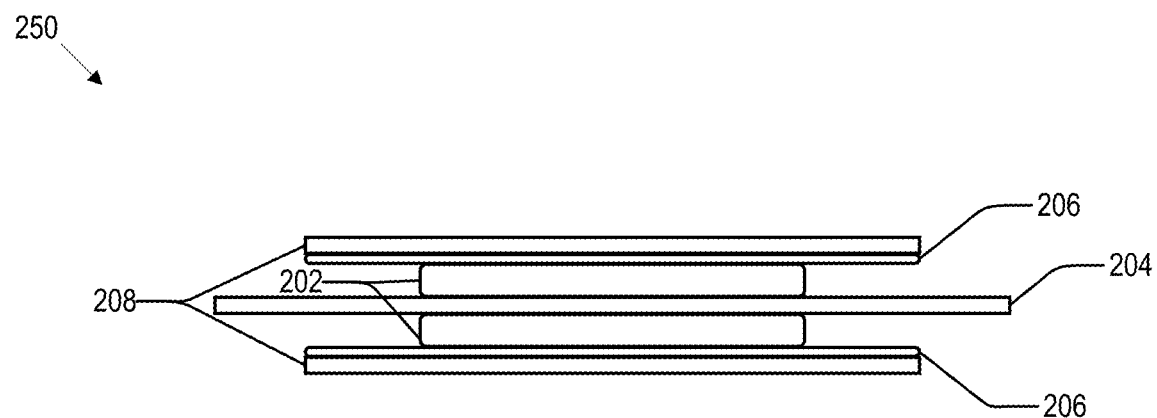

FIG. 2B illustrates a parallel plate capacitor 250 with SDM 206 outside both sides of the core 202, 204 of the capacitor 250. The capacitor core 202, 204 is modified with a larger central dielectric sheet 204 (e.g., 5 cm×5 cm). Similar to the FIG. 2A, a layer of super dielectric material 206 is affixed to the outside surfaces 208 by using gel coated 3.5 cm×3.5 cm separators 208. Unlike FIG. 2A, the outer surface superdielectric gels 206 are organized such that the super dielectric gel 206 on the top and bottom electrodes 202 are not in physical/electrical contact. Specifically, because the center dielectric material is a larger square than the top and bottom gel coated polymers 206, 208, the gel 206 on top and the gel 206 on the bottom are not in contact.

In some cases, the SDM 206 used in the capacitors 200, 250 is a gel composed of fumed silica (e.g., Sigma Aldrich, 0.007 μm avg. particle size from St. Louis, Mo. USA), and water with dissolved NaCl (e.g., Sigma Aldrich 10 mesh anhydrous beads). The weight ratio employed Silica/NaCl/H$_2$O may be 1/2.3/8.7. The fumed silica is a very hygroscopic material that reaches the point of "incipient wetness" at a weight ratio of 8.8 parts water to 1 part fumed silica. The salt weight reflects a weight concentration of about 25% in water, safely below the saturation concentration of NaCl in water at 298 K, ~36%. The gel formed is a nearly transparent/white color, very viscous, and holds the shape into which it is molded for prolonged periods. The gel shows no sign of 'water leakage', even when place on an adsorbent material.

During testing, dielectric constant, energy and power density were computed from 'constant current' galvanostat data (e.g., using a BioLogic Model SP 300 Galvanostat, Bio-Logic Science Instruments SAS in Claix, France). The device was operated in constant current charge/discharge mode over a limited voltage range, 0 to 10 Volts. Data collected in this mode readily yields capacitance (current divided by the slope of the voltage-time data), which in turn is readily converted to dielectric constant by Equation (1) below for a parallel plate capacitor:

$$\varepsilon = \frac{C * t}{A * \varepsilon_0} \quad (1)$$

Where C is the measured capacitance, t is the thickness of the dielectric layer, A is the area of the electrode, and $\varepsilon_0$ is the permittivity of free space. Energy is computed as the integral of area under the voltage time data (volts*sec) multiplied by current (amps), and power is computed as the total energy of the discharge divided by the total discharge time. The data collected using this method is far easier to deconvolute than alternative methods such as cyclic voltammetry. Also, unlike impedance spectroscopy, which is limited to providing values based on measurements conducted over a very small voltage range (+/−15 mV), the constant current method uses data collected over the full voltage range to determine energy and power. The only true independent variable, the value of the constant current, can be adjusted to provide different discharge times, hence 'frequency dependent' information. Thus, a higher current results in a shorter discharge time. For all capacitors the current was varied in six of seven steps between 0.025 mA and 10 mA. In all tested cases, the current was the same for both the charge and discharge components of the cycle. Generally, the reported values of parameters are the average of 10 cycles as discussed below with respect to FIG. 3.

During testing of embodiments described herein, it was found that there are essentially two ranges of capacitance as a function of voltage clearly distinguishable during the discharge. The first range from 10 volts to ~1.2 volts is very low and not a subject of significant inquiry during testing. The second range, orders of magnitude higher, is from 1.2 volts to 0 volts. For this reason, the capacitance and dielectric values discussed herein are only reported based on data in the discharge ~1.0 and 0 V. In this voltage regime the voltage vs. time relationship was found to be nearly linear for all discharge times greater than 0.01 seconds, indicating constant capacitance over this voltage region. Given the extreme dependence of capacitance on discharge time even at ca. 0.1 Hz, new paradigm supercapacitors (NP Supercapacitors), like all other supercapacitors, are not appropriate for use in electronic systems. The purpose of these capacitors is to serve as energy storage or power delivery.

It is also notable that the standard protocol for capacitance testing involved three steps: (1) charging to 10 V at 3 mA; (2) holding the voltage at 10 V for 200 seconds or longer; and (2) discharging the capacitor at a constant current, where the value of the current varies to provide a range of discharge times. This protocol is very similar to that employed to characterize the 'capacitance' of commercial supercapacitors.

The testing of the embodiments herein is designed to collect capacitance, dielectric constant, energy and power density data in order to test/contrast two hypotheses regarding how the four types of capacitors (FIGS. 1A-1B and 2A-2B) should behave. The text-book hypothesis predicts that capacitors 100, 200, and 250 should behave identically because their capacitor cores, two electrodes with a thin section of low dielectric constant organic/polymeric 'dielectric' between, are effectively identical. In contrast, the SDM postulate predicts typical capacitor 100 and outside SDM capacitor 200 should show radically different behavior. For example, outside SDM capacitor 200 is predicted to have a dielectric constant orders of magnitude higher than typical capacitor 100. The discussion of FIG. 2 below presents data that is consistent with the SDM hypothesis. It is also notable that SDM behavior in a system employing metal electrodes is reported herein for the first time.

Figure 3:
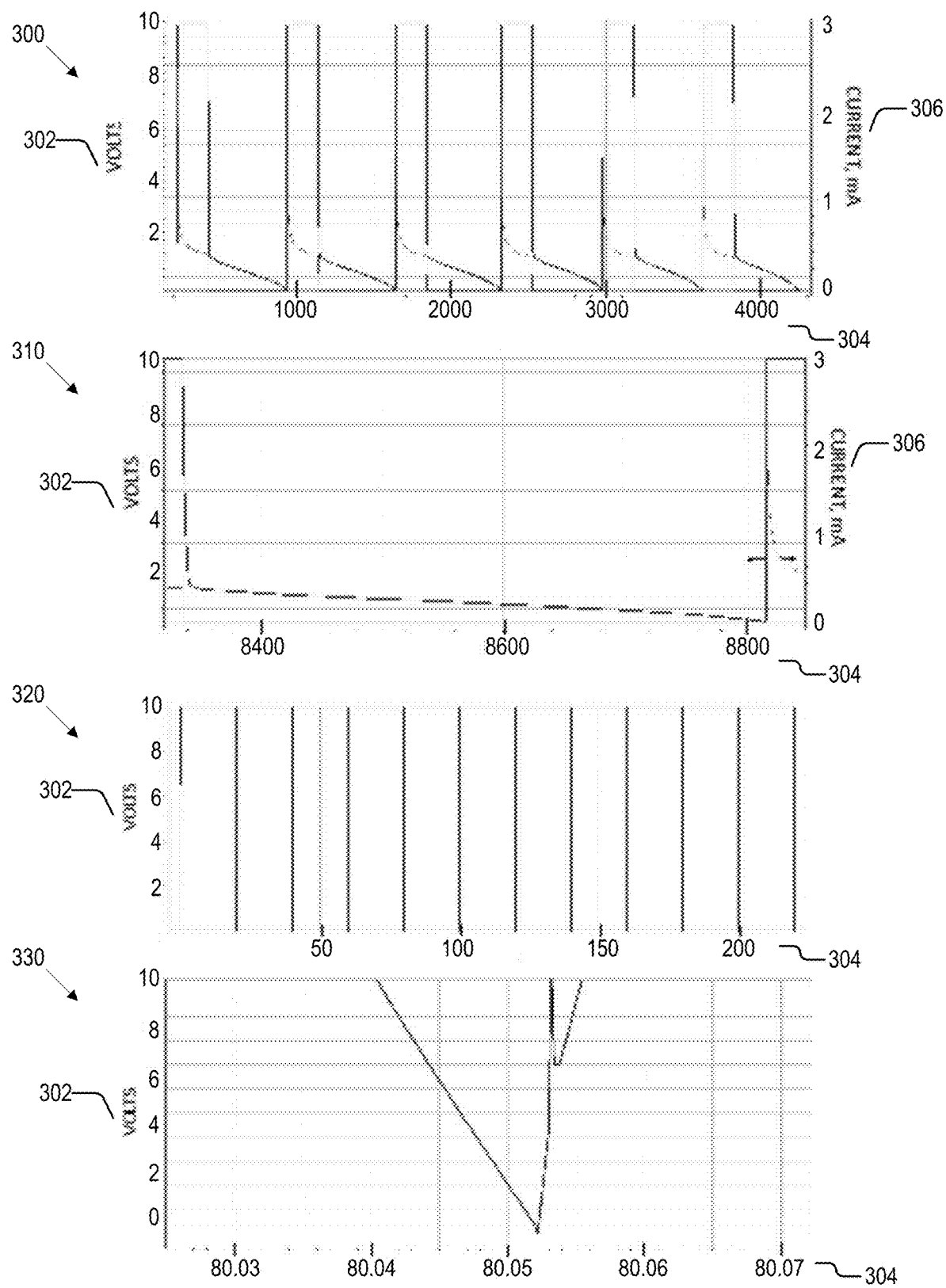
FIG. 3 shows test results from four different testing procedures of embodiments described herein.

FIG. 3 shows test results 300 from four different testing procedures of embodiments described herein. Each of the test results plot volts 302 versus time 304 in seconds. Test A 300 shows six cycles with discharge current 0.05 mA on the parallel plate capacitor 200 of FIG. 2A built with LLDPE. Test B 310 shows a single cycle at discharge current 0.05 mA on the parallel plate capacitor 200 of FIG. 2A built with Celgard. Test C 320 shows eleven cycles at discharge current 0.05 mA on the typical capacitor 100 of FIG. 1A built with Celgard, where enlarged results 330 show one cycle of test C 320. Note that in the constant current mode the galvanostat 'overshoots' the minimum voltage and maximum voltage (i.e., "U shaped" region is the instrument self-correcting). Further, Discharge Time Test B 310/Discharge Time enlarged results 330=500,000 below one volt. These capacitors 100, 200 are identical except for dielectric outside the volume with respect to parallel capacitor 200, which according to the standard paradigm, constitutes "the capacitor."

As shown in FIG. 3 for a typical capacitor 100, even at the lowest stable constant current setting of the galvanostat, the discharge following prolonged charging at 10 V for both Celgard and LLDPE dielectrics is remarkably rapid, approximately 0.01 seconds/10V at a discharge current of 0.05 mA. This is consistent with a very low dielectric constant, a value anticipated for most polymeric materials. Extensive analysis of typical capacitor 100 behavior is not presented because, as shown below, the capacitance, dielectric constant, energy and power density are very low compared to the other capacitors 150, 200, 250.

Figure 4:
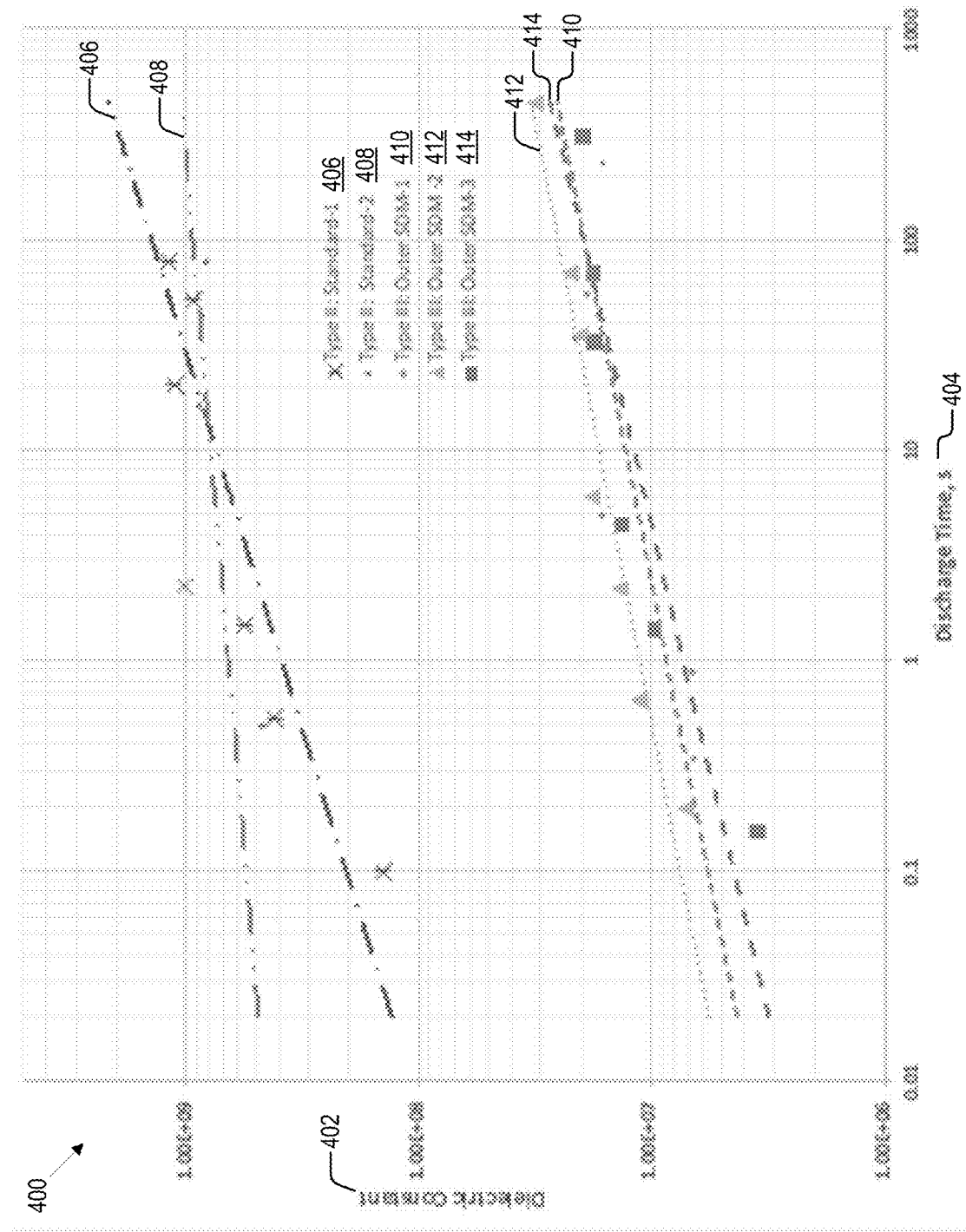
FIG. 4 shows dielectric constant results for five different capacitor configurations.

FIG. 4 shows dielectric constant results 400 for five different capacitor configurations 406-414. The results 400 show dielectric constant 402 versus discharge time 404. The computation of dielectric constants 402 for typical SDM capacitors (150 of FIG. 1B) is conventional and based on the measured thickness of the dielectric layer, per Equation (1), as shown in 406 and 408. For SDM capacitors 200 of FIG. 2A, it was assumed for computational purposes that the thickness is that of the Celgard only, and the determined value 402 is thus called the "effective dielectric constant" as shown in 410, 412, and 414.

As shown in FIG. 3, the discharge time for SDM capacitors 150, 200, 250, even at far higher discharge currents than employed to study typical capacitors 100 is orders of magnitude longer than the typical capacitor 100 discharges. In FIG. 4, this translates, for voltages lower than about 1.2 volts, into dielectric constants >$10^7$ even for very rapid discharges, a result only found for SDM capacitors 150, 200, 250. In particular, the magnitudes of the dielectric constants measured in the low voltage regime are very similar to those reported earlier for SDM based capacitors built with a gel of a very similar composition, employing carbon electrodes, and also only below ~1 volt. Another notable aspect of the observations here and in all other SDM studies is that the dielectric constant decreases as the discharge time is decreased. In fact, roll-off of capacitance with increasing frequency/decreased discharge time is anticipated for capacitors of all types.

In FIG. 4, the restricted voltage for valid dielectric value measurements 402 is consistent with observations made in earlier studies with NPSupercapacitors. In all cases high capacitance and dielectric values are only observed below ~1 volt, as per the present case. As shown in 406 and 408, above this voltage the dielectric constant for typical SDM capacitors 150 is very low and not a subject of the present investigation.

It is also clear that dielectric values 402 as a function of discharge time are not perfectly fit by power law expressions. This is consistent with earlier observations that dielectric values 402, although indicative of all behaviors for ceramic and other types of capacitors, are not the best indicator of performance of any type of supercapacitor including NPSupercapacitors. One difficulty with the use of this parameter for the NPSupercapacitor is that of the method employed to determine it. As the capacitance is clearly a function of voltage, so is the dielectric constant. There is no absolute voltage below which the capacitance is constant; thus, some error in the selection of voltage range leads, inevitably, to uncertainty in the reported value.

Figure 5:
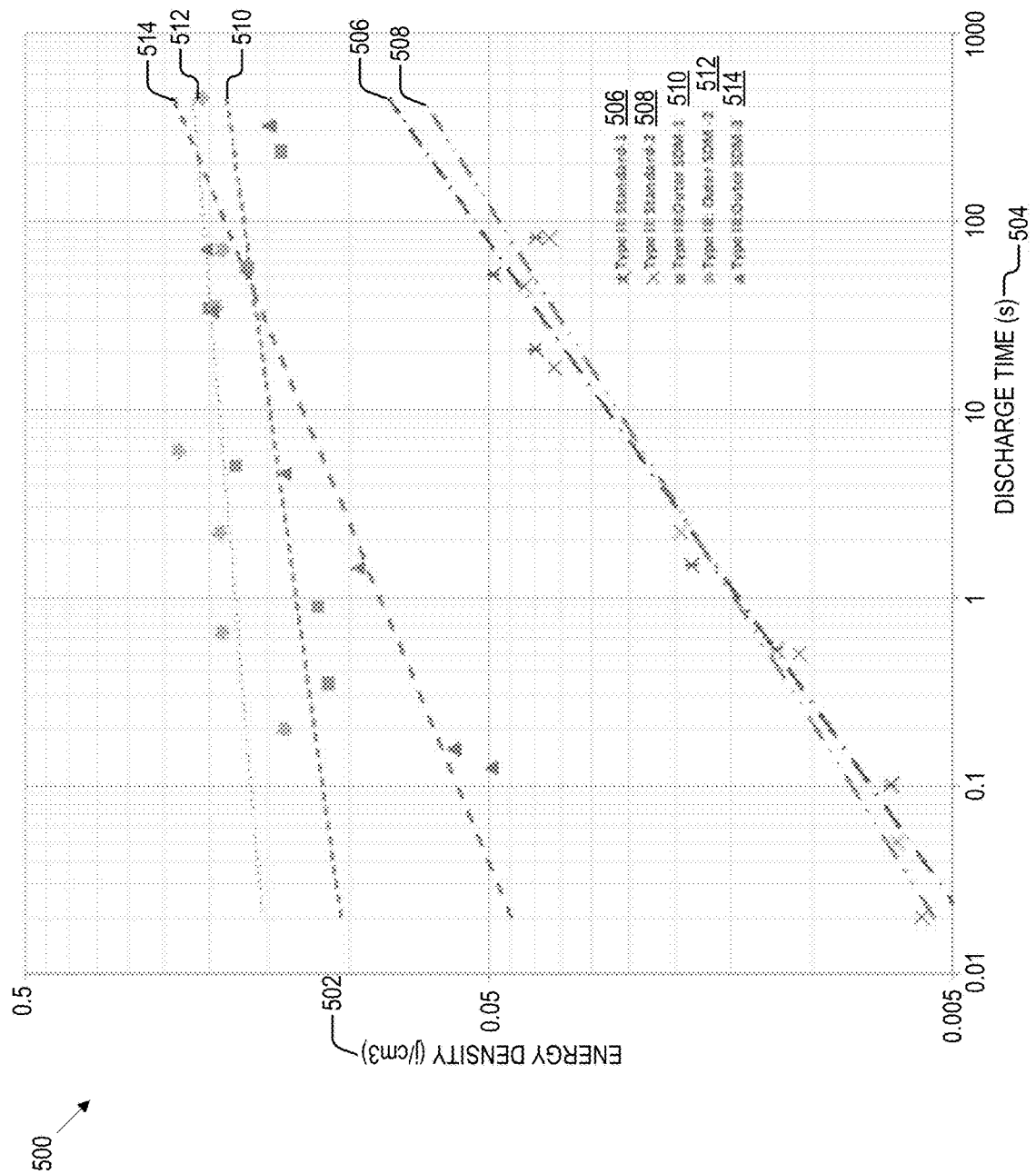
FIG. 5 shows energy density results for five different capacitor configurations.

FIG. 5 shows energy density results 500 for five different capacitor configurations 506-514. The energy density for the standard SDM capacitors 150 follows a clear power law function as shown in 506 and 508, dropping with increasingly short discharge times, whereas the outside SDM capacitor 200 behavior is more chaotic, but still slowly decreasing, with decreased discharge time as shown in 510-514. Note that the values for energy density 502 computed for the outside SDM capacitor 200 are arguably inflated because of the assumption, per the standard of computing energy density in capacitors, that energy is only associated with the standard capacitor 100 core dielectric volume.

Figure 6:
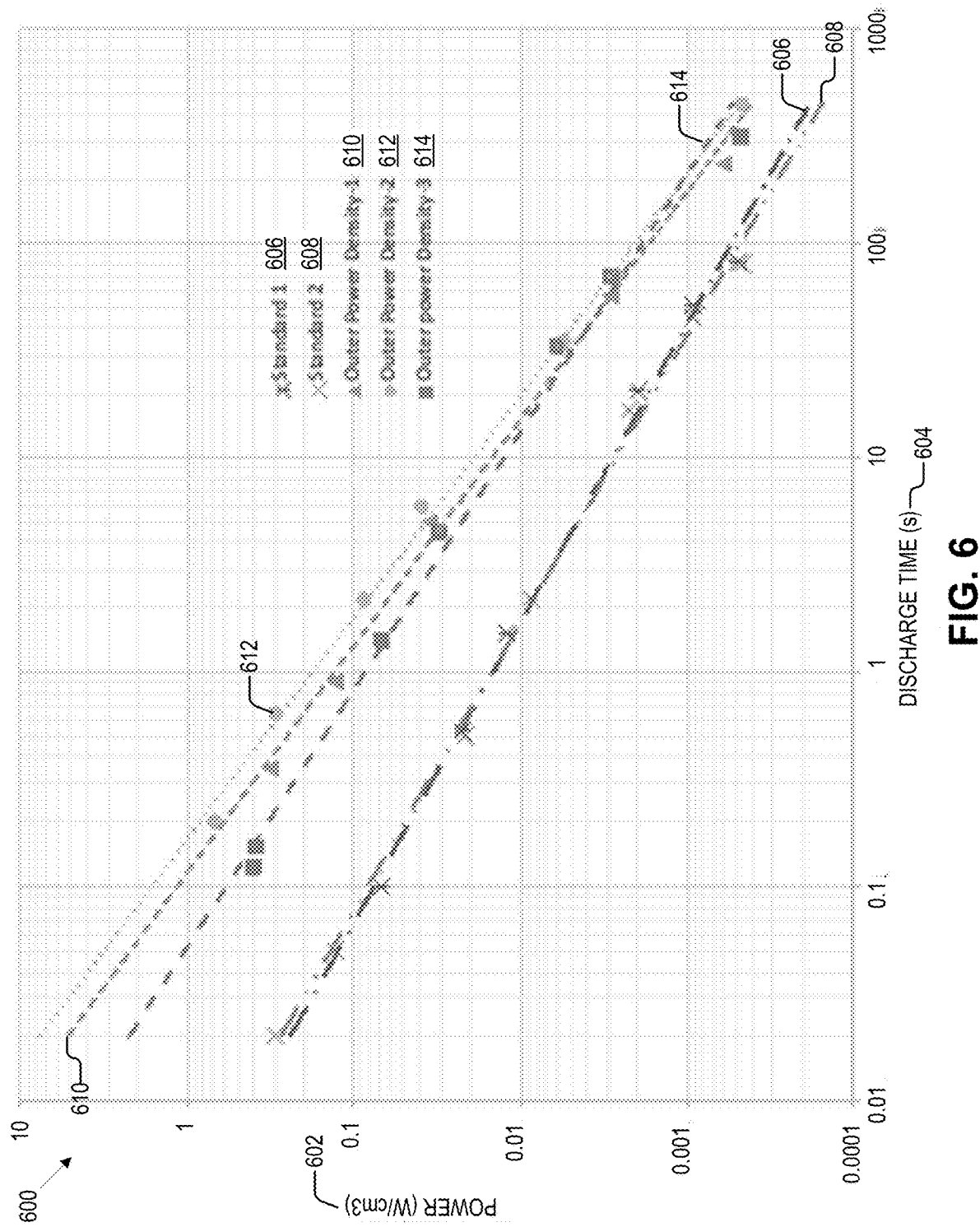
FIG. 6 shows power density results for five different capacitor configurations.

FIG. 6 shows power density results 600 for five different capacitor configurations 606-614. In contrast to dielectric constant values shown in FIG. 4, the trends for standard SDM capacitors 150 in energy density (FIG. 5) and power density (FIG. 6) are almost perfectly fit as a function of discharge time 504, 604 with a simple power law. This reflects the method, which is that the total area under the discharge curve is measured. Unlike determination of the slope of the discharge curve, necessary for computation of dielectric constant, there is no 'art' to making this measurement. This leads to cleaner, more reliably predictive values. It is straightforward and reliable. As discussed below and argued elsewhere, Energy and Power density are better performance indicators than dielectric constant for NPSupercapacitors.

In FIG. 6 in all cases, it is shown that the power density increases, according to a simple power law relationship, as the discharge time decreases. The power density trends reflect the ratio of the rate of energy density loss to the rate of discharge time decrease. The latter is clearly faster. As noted for energy density, the power density computed for outside SDM capacitors 200 are arguably inflated because of the assumption, per the standard of computing power density in capacitors, that energy is only associated with the standard capacitor 100 core dielectric volume.

In sum, standard NPSupercapacitors 150 behave as anticipated based on extrapolation of observations of other SDM based capacitors in terms of values, and trends with discharge time, of dielectric constant, energy and power density. One unique outcome from the testing results herein is the demonstration that the use of metal electrodes does not change the fundamentals of SDM based capacitors.

As shown in results 300, 310 FIG. 3 with respect to outside SDM capacitors 200, the discharge time for these capacitors is extremely long compared to typical capacitors 100, a result clearly not anticipated by the standard hypothesis. In FIG. 4, the equivalent dielectric constant (EDC), computed assuming only the material between the electrodes contributes to this value, is greater than $10^7$ for discharge times longer than ~10 s. Moreover, essentially the same results are obtained repeatedly for the different outside SDM capacitors 200, validating the results.

The computation of enormous EDC values for outer SDM capacitors 200 as shown in 410-414 of FIG. 4 is strong empirical support of the SDM hypothesis. That is, the "core" is not the only part of the structure of outer SDM capacitors 200 that should be considered, as shown by the EDC that is as much as six orders of magnitude higher than that of standard NPSupercapacitors 100. Not only is the computed EDC consistent with the SDM postulate, it is also a value range found only for NPSupercapacitors 150. Indeed, ceramic capacitors never have been reported to have values higher than $10^5$. The energy (FIG. 5) and power densities (FIG. 6), computed based on assuming only the standard capacitor 100 core dielectric volume should be considered, also attain values consistent with earlier reports of the unique high values found for several types of NPSupercapacitors 150.

In sum, the results presented here for outside SDM capacitors 200 challenge the standard model that only the core section, that the standard structure found at the center of NPSupercapacitors 150 is a significant part of the geometry. Indeed, if only the core part is significant, then the EDC would be similar to that of standard capacitors 100. Given the measured value is repeatedly found to be as much as six orders of magnitude greater, the standard model is effectively debunked.

The high EDC values present a puzzle regarding how to present the results. The standard protocols, employed herein to compute values for FIGS. 5 and 6, essentially to dramatize the impact of dielectric outside the core capacitor volume, are not entirely satisfactory. Now that it is established that dielectric outside the core is contributing to the overall capacitor behavior, a new approach to identifying the "capacitor," and concomitantly the volume to be use in dielectric computation, should be developed.

Discharge data shown in FIG. 3 for standard capacitors 100 shown in 320 and 330 is nearly identical to that collected for extended SDM capacitors 250. In other words, the discharge behavior of extended SDM capacitors 250 is nearly identical to that of standard capacitors 100. As discussed below this is consistent with a simple SDM model of the behavior observed for NPSupercapacitors 150. Namely, ions must travel through the SDM material from the positive electrode to the negative electrode to effect the formation of a large dipole with polarity opposite that of the electrodes themselves. If this charge is blocked from travel, as in the case of extended SDM capacitors 250, net high dielectric performance is not observed.

The preceding test results are consistent with this hypothesis: Dielectrics increase the capacity as shown in Equation (2), $$C=q/V \quad (2)$$

Where C is capacitance, q is charge and V is volts, by partially cancelling the field created by charges on the capacitor electrodes at all points in space.

Given that the voltage is the integrated work done against the field:

$$\text{Voltage}=\int_0^\infty E \cdot dr \quad (3)$$

Where E is the electric field, if the field at all points in space is reduced, the work (voltage) required to bring charges to the capacitor electrodes is reduced. Given that a dielectric reduces the field at all points in space, this naturally leads to an increase in capacitance, per Equation (1). In sum, it takes more stored electrons on the electrodes to reach a given voltage when a dielectric is present because the net field at all points in space is lower when a dielectric is present.

Figure 7A:
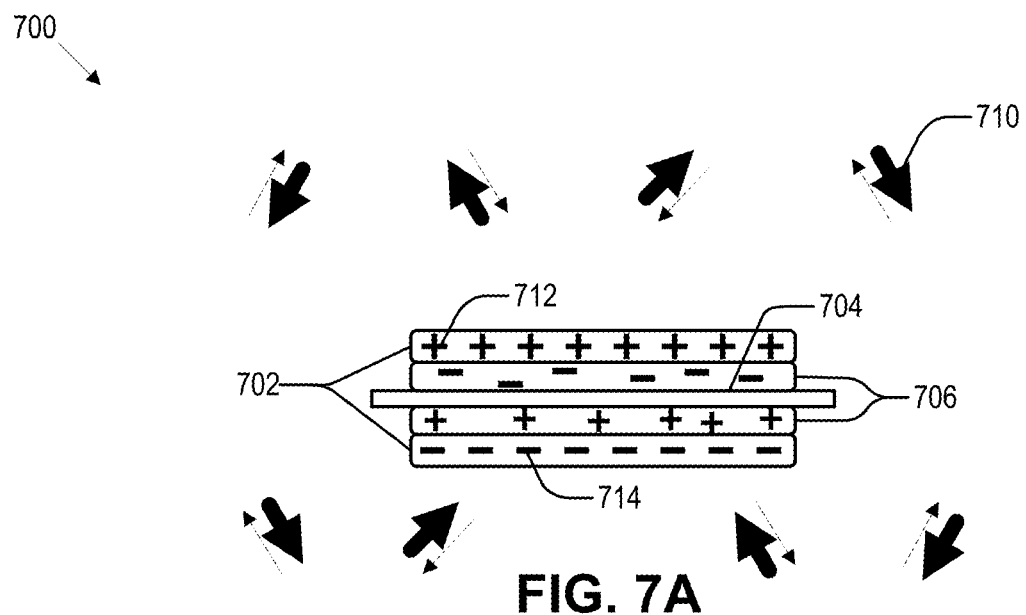
FIGS. 7A and 7B shows capacitors with electrical charges.

FIG. 7A shows a typical NPSupercapacitors 700 with electrical charges 712, 714. Specifically, the charges 712, 714 on the electrodes 702 polarize the charges in a dielectric 706 such that the electrodes 702 produce fields 710 opposite in direction to those produced by charges on the plates 704, 706. Hence; in the presence of a dielectric 706, the field is reduced at every point in space relative to the case of no dielectric. Concomitantly, for the same number of charges on the electrodes, the voltage at the plates is lower when a dielectric is present, per Equation (2). As discussed elsewhere, this means more charge must be brought to an electrode to reach a target voltage for a capacitor with a dielectric 706 than for one without a dielectric. More charge/ electrons at a given voltage is equivalent to more stored energy at that voltage. Moreover, the larger the dipoles induced in a dielectric material by the field generated by the charges on the electrodes 702, the greater the net field reduction by the dielectric. As SDM dipoles form via ionic movement within a liquid media, the dipoles formed are far larger than those found in solids. As discussed in earlier reports in SDM, the dipole lengths are order of microns, whereas in traditional solid dielectrics such as barium titanate, the dipoles are fraction of an A in length.

Figure 7B:
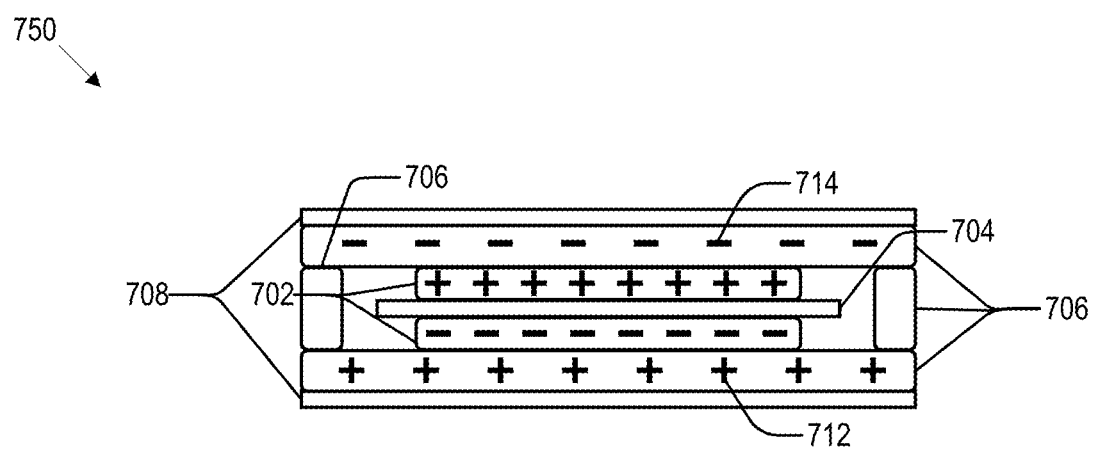

The above model indicates any and all arrangements of dielectric material that result in the partial cancellation of the fields 710 created by the charges on the electrodes will lead to improved dielectric values, energy density, etc. In this regard, outside SDM capacitors 200 of this study are exemplary. As shown in FIG. 7B, the charges 712, 714 on the electrodes 702 induces an opposite polarization of charges 712, 714 within the external dielectric material 706. In particular charge, in the form of ions, flows within the dielectric 706 to produce a net positive dielectric material along the positive metal electrode 702 and a net negative material along the negative metal electrode 702. This in turn will reduce the net field at all points in space, including the volume between the electrodes. The net impact on parameters such as 'effective dielectric value', energy density, power density should be similar to that observed for a conventional capacitor geometry 150.

The model states that there must be a net charge transfer between dielectric material 706 adjacent to the positive electrode 702 and that adjacent to the negative electrode 702. Indeed, in the absence of this charge transfer, the dipoles will form in each outer gel section 706 will be oppositely polarized to each other. It is assumed that the electric fields of electrically isolated, outer dielectric layers 706 cancel. That is, the outer dielectrics of electrically isolated outer dielectric layers 706 are oppositely polarized, and the electric fields created by the outer dielectric layers 706 cancel at all points in space. In this case there should be little or no net effect to outer dielectrics. This is in fact observed for extended SDM capacitor 250 geometry. Extended SDM capacitors 250 behave nearly identical to a typical capacitor 100. The extended dielectric of extended SDM capacitors 250 is a barrier to charge transfer between the gel material on the top and bottom of the capacitor. If no net charge can pass, no effective dipole can form.

The dielectric material in capacitor 700 of FIG. 7A is polarized such that the fields created by the dielectric (dashed arrows) are oppositely directed at all points in space to the fields created by the charges on the electrodes 702 (solid arrows). In Outer SDM capacitor 750 of FIG. 7B, charge travels between the two outerdielectric layers 706. The traveling charge creates a dipole oppositely polarized to that created by charges on the electrodes 702. Thus, the net field at every point in space is lower relative to the condition in which no outer SDM dielectric layer is present. Thus, as per Equations (2) and (3), the capacitance is increased.

The previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A parallel plate capacitor comprising:
a cathode core comprising:
a pair of parallel electrodes that each comprise an electrically conducting material; an inner dielectric material layer positioned between the pair of parallel electrodes; and
an applied electric field generated from the pair of parallel electrodes;
an outer dielectric liquid medium that is continuously liquid; and
connects a positive electrode of the pair of electrodes to a negative electrode of the pair of electrodes so that ions flow from the positive electrode outer surface to the negative electrode outer surface thereby inducing an electric dipole that opposes and reduces the applied electric field of
the pair of parallel electrodes, where:
the positive electrode outer surface and the negative electrode outer surface, each outer surface not in contact with the inner dielectric material is covered by the outer dielectric liquid medium; and
an internal surface of the positive electrode and the negative electrode is not in contact with the outer dielectric liquid medium.

2. The parallel plate capacitor of claim 1, where the outer dielectric liquid medium is water and the inner dielectric material layer is solid or gas.

3. The parallel plate capacitor of claim 1, where the outer dielectric liquid medium is water and the inner dielectric material layer is liquid.

4. The parallel plate capacitor of claim 1, where the outer dielectric liquid medium is water containing a dissolved salt and the inner dielectric material layer is a solid or gas.

5. The parallel plate capacitor of claim 1, where the outer dielectric liquid medium is a liquid polar solvent and the inner dielectric material layer is a liquid.

6. The parallel plate capacitor of claim 1, where the outer dielectric liquid medium is a liquid polar solvent and the inner dielectric material layer is a solid or gas.

7. The parallel plate capacitor of claim 1, where the outer dielectric liquid medium is a liquid polar solvent that includes a dissolved salt and the inner dielectric material layer is a solid or gas.

8. The parallel plate capacitor of claim 1, where the outer dielectric liquid medium is a liquid polar solvent that includes dissolved salt and the inner dielectric material layer is a liquid.

9. The parallel plate capacitor of claim 1, where the outer dielectric liquid medium is a liquid acid.

10. The parallel plate capacitor of claim 1, where the outer dielectric liquid medium is a liquid base.

11. The parallel plate capacitor of claim 1, where the outer dielectric liquid medium comprises a polar liquid and a solid material.

12. The parallel plate capacitor of claim 1, where the outer dielectric liquid medium comprises a polar liquid, a dissolved salt, and a solid material.

13. The parallel plate capacitor of claim 1, where the outer dielectric liquid medium is fumed silica gel and water with dissolved salt.

14. The parallel plate capacitor of claim 13, where a weight concentration of the water with dissolved salt is about 25%.

15. The parallel plate capacitor of claim 1, where the outer dielectric liquid medium is a polar liquid that includes dissolved salts, and where the each of the parallel electrodes is about 25 microns thick, and where the inner dielectric material layer is about 25 microns thick.

16. The parallel plate capacitor of claim 1, where the outer dielectric liquid medium is a polar liquid mixed with solid particles, and where the each of the parallel electrodes is about 25 microns thick, and where the inner dielectric material layer is about 25 microns thick.

* * * * *